United States Patent
Kumano et al.

(10) Patent No.: US 10,993,002 B2
(45) Date of Patent: Apr. 27, 2021

(54) INFORMATION PROCESSING DEVICE, INFORMATION PROCESSING METHOD, PROGRAM, AND COMMUNICATION DEVICE

(71) Applicants: MITSUBISHI HEAVY INDUSTRIES, LTD., Tokyo (JP); Mitsubishi Hitachi Power Systems, Ltd., Yokohama (JP)

(72) Inventors: Shintaro Kumano, Tokyo (JP); Makoto Kishi, Tokyo (JP); Keisuke Yamamoto, Tokyo (JP); Katsuhiko Abe, Yokohama (JP)

(73) Assignees: MITSUBISHI HEAVY INDUSTRIES, LTD., Tokyo (JP); MITSUBISHI POWER, LTD., Yokohama (JP)

( * ) Notice: Subject to any disclaimer, the term of this patent is extended or adjusted under 35 U.S.C. 154(b) by 0 days.

(21) Appl. No.: 16/496,726

(22) PCT Filed: Mar. 26, 2018

(86) PCT No.: PCT/JP2018/012011
§ 371 (c)(1),
(2) Date: Sep. 23, 2019

(87) PCT Pub. No.: WO2018/181114
PCT Pub. Date: Oct. 4, 2018

(65) Prior Publication Data
US 2020/0029135 A1   Jan. 23, 2020

(30) Foreign Application Priority Data
Mar. 29, 2017 (JP) .............................. JP2017-065895

(51) Int. Cl.
*H04Q 9/02* (2006.01)

(52) U.S. Cl.
CPC ........... *H04Q 9/02* (2013.01); *H04Q 2209/10* (2013.01); *H04Q 2209/823* (2013.01)

(58) Field of Classification Search
CPC ........ H04Q 9/00; H04Q 9/02; H04Q 2209/00; H04Q 2209/10; H04Q 2209/30;
(Continued)

(56) References Cited

U.S. PATENT DOCUMENTS

| 5,287,284 A | 2/1994 | Sugino et al. |
| 2016/0004794 A1 | 1/2016 | Reimann et al. |

(Continued)

FOREIGN PATENT DOCUMENTS

| JP | H04-206533 A | 7/1992 |
| JP | H07-13611 A | 1/1995 |

(Continued)

OTHER PUBLICATIONS

International Search Report dated Jun. 19, 2018, issued in counterpart application No. PCT/JP2018/012011, with English translation. (4 pages).

(Continued)

*Primary Examiner* — Franklin D Balseca
(74) *Attorney, Agent, or Firm* — Westerman, Hattori, Daniels & Adrian, LLP

(57) ABSTRACT

An acquisition unit is configured to acquire a measurement value of a first state quantity of a target device. A model determination unit is configured to determine a model for estimating a value of a second state quantity of the target device for each evaluation item for management of the target device. An estimation unit is configured to estimate the value of the second state quantity on the basis of the measurement value using the model determined by the model determina- (Continued)

tion unit. A management unit calculates a value of the evaluation item using the value estimated by the estimation unit.

10 Claims, 10 Drawing Sheets

(58) Field of Classification Search
CPC ........... H04Q 2209/40; H04Q 2209/70; H04Q 2209/75; H04Q 2209/80; H04Q 2209/82; H04Q 2209/823
See application file for complete search history.

(56) References Cited

U.S. PATENT DOCUMENTS

| | | | |
|---|---|---|---|
| 2016/0169771 A1 | 6/2016 | Hiruta et al. | |
| 2016/0364510 A1 | 12/2016 | Kashiwa et al. | |
| 2019/0028783 A1* | 1/2019 | Clucas | H04Q 9/02 |

FOREIGN PATENT DOCUMENTS

| | | | | |
|---|---|---|---|---|
| JP | 2012112330 A * | 6/2012 | ............ | G01M 99/00 |
| JP | 2016-48617 A | 4/2016 | | |
| JP | 2017-004278 A | 1/2017 | | |
| WO | 2014/207789 A1 | 12/2014 | | |

OTHER PUBLICATIONS

Written Opinion dated Jun. 19, 2018, issued in counterpart application No. PCT/JP2018/012011, with English translation. (9 pages).

* cited by examiner

INFORMATION PROCESSING DEVICE, INFORMATION PROCESSING METHOD, PROGRAM, AND COMMUNICATION DEVICE

TECHNICAL FIELD

The present invention relates to an information processing device, an information processing method, a program, and a communication device.

Priority is claimed on Japanese Patent Application No. 2017-065895, filed Mar. 29, 2017, the content of which is incorporated herein by reference.

BACKGROUND ART

It is conceivable that, in a plant such as a power generation plant, a monitoring device collects state quantities of a target device such as a temperature and a pressure during the operation of a device constituting the plant, and the collected state quantities be used for the maintenance, monitoring, and the like of the device (see, for example, Patent Document 1).

CITATION LIST

Patent Documents

[Patent Document 1] United States Patent Application, Publication No. 2016/0004794

SUMMARY OF INVENTION

Technical Problem

Patent Document 1 or the like discloses that state quantities are acquired from instruments within a plant. However, generally, all instruments within a plant are not necessarily provided with measurement instruments that measure state quantities.

Therefore, it is necessary for an information processing device to collect a measurement value of a state quantity from an instrument, estimate a value of a state quantity of an instrument of which the state quantity is not able to be collected, and predict a state resulting from the operation of a plant from a measurement value and an estimation value. However, in a case where there are a plurality of models for describing a plant, it is not clear which of the models to be used for calculating an estimation value enables the plant to be managed appropriately.

The present invention is contrived in view of the above-described problems, and an object thereof is to determine an appropriate model for the purpose of use for calculation of an estimation value of a state quantity of an instrument.

Solution to Problem

According to a first aspect of the present invention, there is provided an information processing device including: a measurement value acquisition unit that is configured to acquire a measurement value of a first state quantity of a target device; a model determination unit that is configured to determine a model for estimating a value of a second state quantity of the target device for each evaluation item for management of the target device; an estimation unit that is configured to estimate the value of the second state quantity on the basis of the measurement value using the model determined by the model determination unit; and a management unit that is configured to calculate a value of the evaluation item using the value estimated by the estimation unit.

According to a second aspect of the present invention, the information processing device according to the first aspect may further include an acquisition determination unit that is configured to determine whether to acquire measurement values with respect to a plurality of state quantities of the target device, the measurement value acquisition unit may acquire a measurement value of a state quantity in which it is determined that a measurement value is acquired, and the estimation unit is configured to estimate a value of a state quantity in which it is determined that a measurement value is not acquired using the model.

According to a third aspect of the present invention, in the information processing device according to the second aspect, the acquisition determination unit is configured to determine whether to acquire a measurement value on the basis of the evaluation item.

According to a fourth aspect of the present invention, in the information processing device according to the second or third aspect, the acquisition determination unit is configured to determine whether to acquire a measurement value on the basis of a configuration of the target device.

According to a fifth aspect of the present invention, in the information processing device according to any one of the second to fourth aspects, the acquisition determination unit is configured to determine whether to acquire a measurement value on the basis of a ratio of change of the value of the state quantity in the model.

According to a sixth aspect of the present invention, in the information processing device according to any one of the first to fifth aspects, the model may include at least any one of a statistical model and a physical model.

According to a seventh aspect of the present invention, the information processing device according to any one of the first to sixth aspects may further include a model updating unit that is configured to update the model on the basis of the value of the state quantity, and the estimation unit may estimate the value of the state quantity using the updated model.

According to an eighth aspect of the present invention, there is provided a communication device including: an acquisition unit that is configured to acquire measurement values from a plurality of measurement instruments that measure a state quantity of a target device; an extraction unit that is configured to extract a measurement value to be transmitted to a management device that is configured to manage the target device from among the measurement values acquired by the plurality of measurement instruments on the basis of an evaluation item for management of the target device or in accordance with a request for transmission of a state quantity received from the management device; and a transmission unit that is configured to transmit the measurement value extracted by the extraction unit to the management device.

According to a ninth aspect of the present invention, there is provided an information processing method including: acquiring a measurement value of a first state quantity of a target device; determining a model for estimating a value of a second state quantity of the target device for each evaluation item for management of the target device; estimating the value of the second state quantity on the basis of the measurement value using the determined model; and calculating a value of the evaluation item using the estimated value.

According to a tenth aspect of the present invention, there is provided a program for causing a computer to execute: acquiring a measurement value of a first state quantity of a target device; determining a model for estimating a value of a second state quantity of the target device for each evaluation item for management of the target device; estimating the value of the second state quantity on the basis of the measurement value using the determined model; and calculating a value of the evaluation item using the estimated value.

Advantageous Effects of Invention

According to at least one of the aspects, the information processing device is configured to estimate the value of the second state quantity on the basis of a model determined for each evaluation item for management of the target device. Thereby, it is possible to determine a model appropriate for each evaluation item for the purpose of use for calculation of an estimation value of a state quantity of the target device.

DESCRIPTION OF EMBODIMENTS

First Embodiment

Hereinafter, embodiments will be described in detail with reference to the accompanying drawings.

Figure 1:
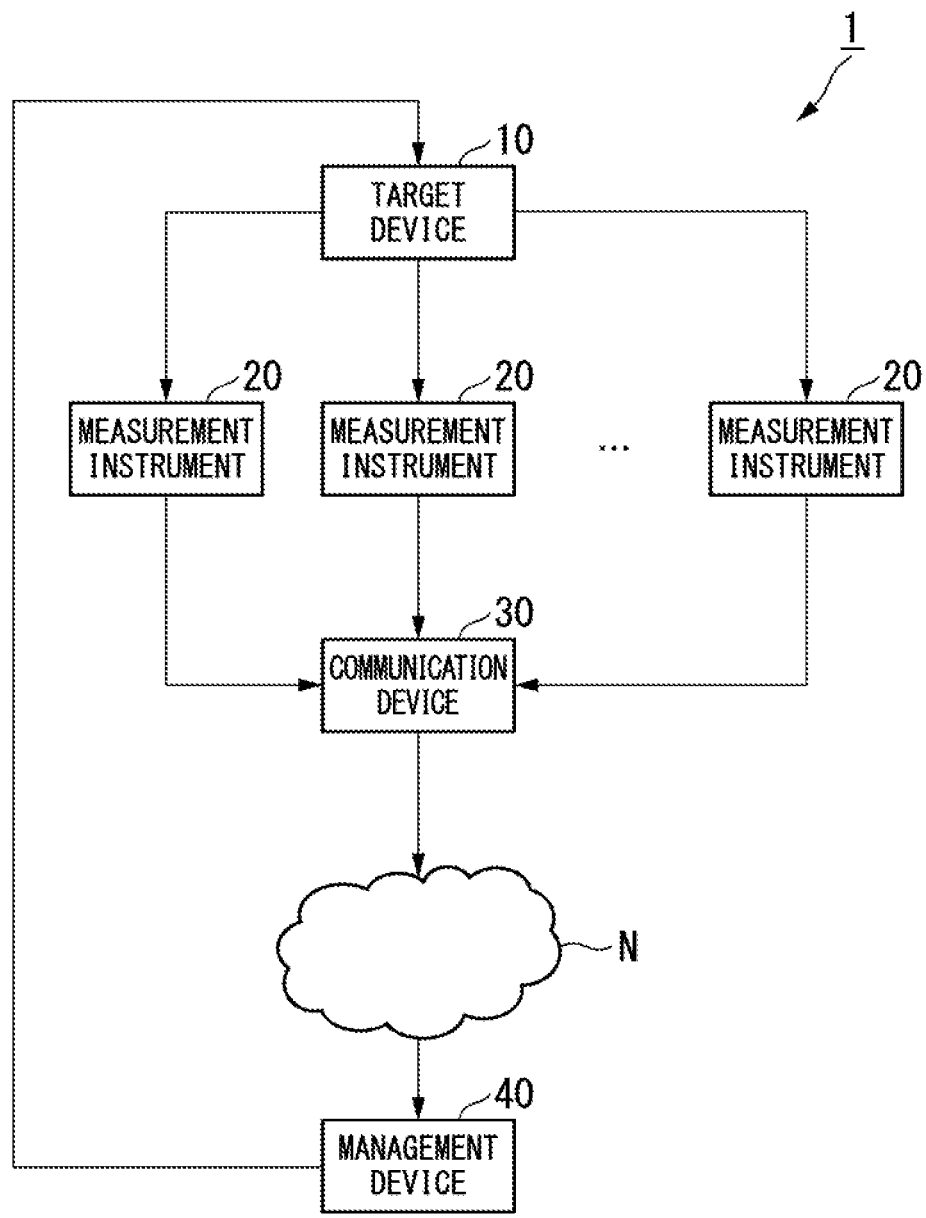
FIG. 1 is a schematic block diagram showing a configuration of a management system according to a first embodiment.

FIG. 1 is a schematic block diagram showing a configuration of a management system according to a first embodiment.

A management system 1 includes a target device 10, a plurality of measurement instruments 20, a communication device 30, and a management device 40.

The target device 10 is a device to be managed by the management device 40. Examples of the target device 10 include a gas turbine, a steam turbine, a boiler, a coal gasification furnace, and the like. In addition, the target device may be a transportation system such as an environmental plant, a chemical plant, and an aircraft.

The measurement instrument 20 is provided in the target device 10 and measures a state quantity of the target device 10. Meanwhile, the measurement instrument 20 is not necessarily provided in all machines constituting the target device 10.

The communication device 30 transmits a measurement value of the state quantity measured by the measurement instrument 20 to the management device 40 through a network N.

The management device 40 manages the target device 10 on the basis of the measurement value received from the communication device 30. The management device 40 is an example of an information processing device.

<<Configuration of Management Device>>

Figure 2:
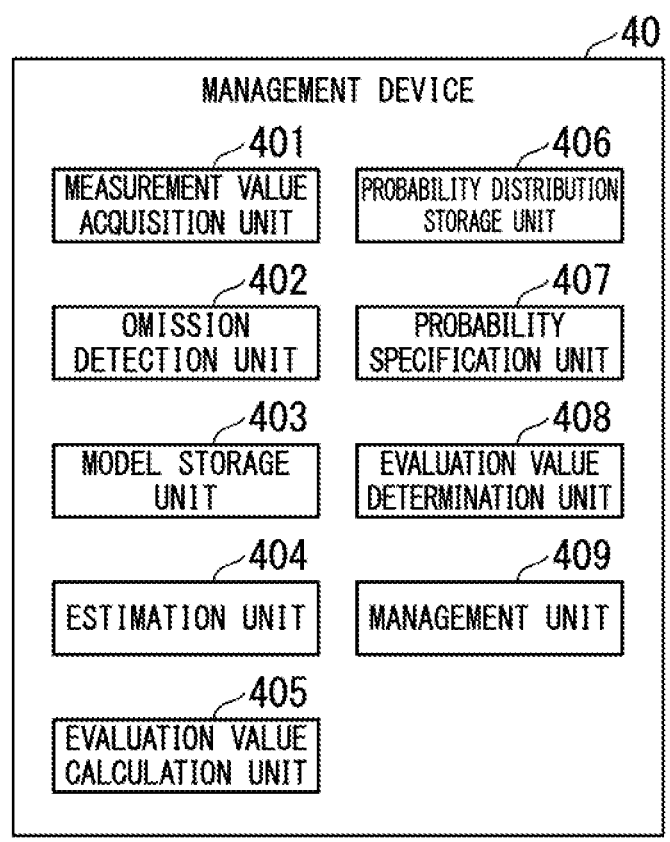
FIG. 2 is a schematic block diagram showing a configuration of a management device according to the first embodiment.

FIG. 2 is a schematic block diagram showing a configuration of the management device according to the first embodiment.

The management device 40 includes a measurement value acquisition unit 401, an omission detection unit 402, a model storage unit 403, an estimation unit 404, an evaluation value calculation unit 405, a probability distribution storage unit 406, a probability specification unit 407, an evaluation value determination unit 408, and a management unit 409.

The measurement value acquisition unit 401 receives measurement values of state quantities measured by a plurality of measurement instruments 20 from the communication device 30.

The omission detection unit 402 detects a state quantity, of which the value is omitted among state quantities to be managed, on the basis of the plurality of measurement values acquired by the measurement value acquisition unit 401. Here, the omission of a value refers to temporal or spatial omission. For example, in a case where the management unit 409 manages a state quantity for each time $\Delta t$, the omission detection unit 402 detects the omission of a measurement value at time $T+\Delta t$ when a measurement value at time $T$ and a measurement value at time $T+2\Delta t$ are acquired. Further, for example, in a case where the management unit 409 manages a state quantity for each distance $\Delta d$, the omission of measurement values at a position $(0, \Delta d)$, a position $(\Delta d, 0)$, a position $(\Delta d, \Delta d)$, a position $(\Delta d, 2\Delta d)$, and a position $(2\Delta d, \Delta d)$ is detected when measurement values at a position $(0, 0)$, a position $(2\Delta d, 0)$, a position $(0, 2\Delta d)$, and a position $(2\Delta d, 2\Delta d)$ are acquired.

The model storage unit 403 stores a plurality of models for describing the movement of the target device 10. A statistical model or a physical model can be used as the models. The statistical model is a model that statistically reproduces the movement of the target device 10 on the basis of a value of a state quantity in the past operation of the target device 10. The statistical model is updated on the basis of stored values of state quantities in the past operation. The physical model is a model that reproduces the movement of the target device 10 using a numerical expression (for example, a thermodynamic equation) that follows the law of nature on the basis of design information of the target device 10.

The estimation unit 404 estimates a value of a state quantity for each model stored in the model storage unit 403 on the basis of a measurement value measured by the measurement value acquisition unit 401. Hereinafter, a state quantity to be estimated by the estimation unit 404 will be referred to as a target state quantity. That is, the estimation unit 404 calculates values of a plurality of target state quantities using different models.

The evaluation value calculation unit 405 calculates a value of each of a plurality of evaluation items of the target device 10 using each of a plurality of estimation values estimated by the estimation unit 404 and a measurement value measured by the measurement value acquisition unit 401. The evaluation item is an item to be used for the management of the target device 10 which is performed by the management unit 409. Examples of the evaluation item include the amount of NOx emission, electricity sales revenues, the temperature of gas, and the like.

The probability distribution storage unit 406 stores a probability distribution table in which a value of an evaluation item and a probability of taking the value are associated with each other. The probability distribution table is obtained in advance using design information of the target device 10 or the statistics of values of past evaluation items. Meanwhile, the probability distribution storage unit 406 may store a probability distribution function instead of the probability distribution table.

The probability specification unit 407 specifies a probability of taking each evaluation value calculated by the evaluation value calculation unit 405 on the basis of probability distribution information stored in the probability distribution storage unit 406.

The evaluation value determination unit 408 specifies an evaluation value having a highest probability specified by the probability specification unit 407 for each evaluation item, and determines this evaluation value as an evaluation value to be used for the management of the target device 10. Meanwhile, determining an evaluation value having a highest probability as an evaluation value to be used for management is equivalent to determining a model used for the calculation of an evaluation value having a highest probability as a model for estimating a value of a state quantity to be used for the calculation of an evaluation item. That is, the evaluation value determination unit 408 is an example of a model determination unit.

The management unit 409 manages the target device 10 on the basis of an evaluation value determined by the evaluation value determination unit 408. Examples of the management of the target device 10 include calculating the amount of control of the target device 10 so that an evaluation value is optimized, outputting a control signal, and the like. Examples of the evaluation item include the amount of NOx emission, electricity sales revenues, the temperature of gas, and the like.

<<Operation of Management System>>

Figure 3:
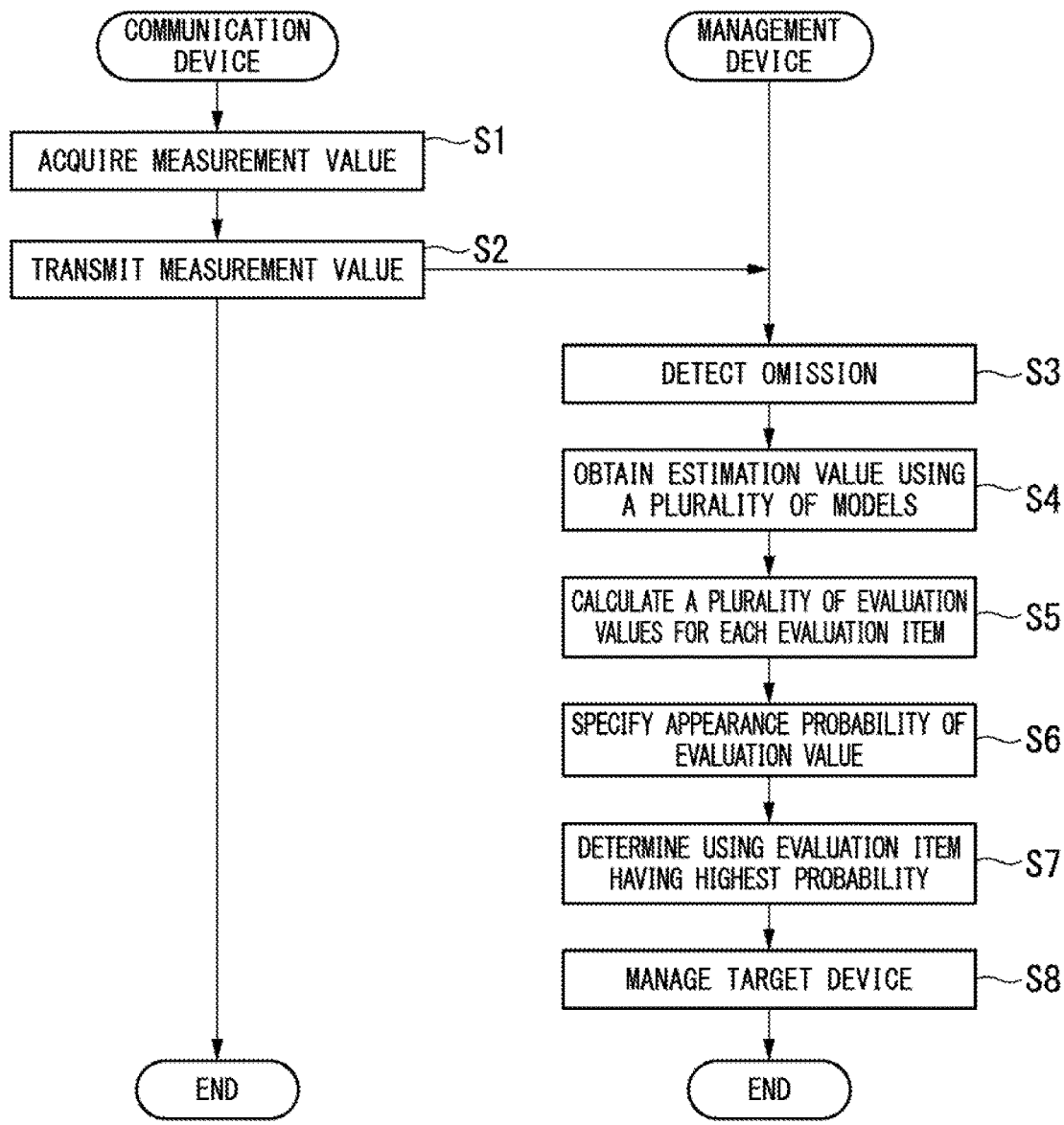
FIG. 3 is a sequence diagram showing operations of the management system according to the first embodiment.

FIG. 3 is a sequence diagram showing operations of a management system according to the first embodiment.

When management by the management system 1 is started, the communication device 30 acquires a measurement value from the measurement instrument 20 (step S1). The communication device 30 transmits the acquired measurement value to the management device 40 (step S2).

When the measurement value acquisition unit 401 of the management device 40 receives a measurement value from the communication device 30, the omission detection unit 402 detects the omission of the measurement value acquired by the measurement value acquisition unit 401 (step S3). The estimation unit 404 applies the measurement value acquired by the measurement value acquisition unit 401 to each of a plurality of models to obtain each of estimation values of state quantities (target state quantities) of which the omission is detected (step S4).

Next, the evaluation value calculation unit 405 calculates values of a plurality of evaluation items on the basis of each of a plurality of estimation values estimated by the estimation unit 404 (step S5). The value of the evaluation item can be obtained using a function having values of a plurality of state quantities as explanation variables. The evaluation value calculation unit 405 calculates an evaluation value by substituting a measurement value and an estimation value for an explanation variable of the function.

Next, the probability specification unit 407 specifies an appearance probability of each evaluation value on the basis of the probability distribution information stored in the probability distribution storage unit 406 (step S6). The evaluation value determination unit 408 then determines an evaluation value having a highest probability specified by the probability specification unit 407, for each evaluation item, as a value of an evaluation item to be used for the management of the target device 10 (step S7). That is, according to the first embodiment, the value of each evaluation item can be calculated by a value of a state quantity estimated by a model which is different for each evaluation item. In this case, the value of a state quantity used for calculation in each evaluation item may differ. The management unit 409 then manages the target device 10 on the basis of the evaluation value determined by the evaluation value determination unit 408 (step S8). In a case where the target device 10 is a gas turbine, the target device 10 is managed on the basis of specified management values, for example, by changing a gas turbine output instruction value, changing the setting of an opening of an IGV, or changing a fuel flow rate.

«Operations and Effects»

In this manner, according to the first embodiment, the management device 40 determines a model for estimating a value of a state quantity for each of a plurality of evaluation items, and manages the target device 10 using a value of an evaluation item calculated by a value of a state quantity estimated on the basis of the model. Thereby, it is possible to calculate an evaluation value using a value of a state quantity appropriate for each evaluation item.

Meanwhile, the management device 40 according to the first embodiment manages the target device 10 using a value of which an occurrence probability is maximized for each evaluation item, but there is no limitation thereto. For example, in other embodiments, the management device 40 may manage the target device 10 using an evaluation value having a worst evaluation for each evaluation item. That is, the management device 40 may use a model having a worst value of an evaluation item, for each evaluation item, in the estimation of a value of a state quantity. Thereby, the management device 40 can perform the management of the target device 10 on the premise of a worst case. Besides, the management device 40 may determine a model for obtaining a value of a state quantity to be used for the calculation of each evaluation item on the basis of any policy.

Second Embodiment

The management system 1 according to the first embodiment estimates a value with respect to a state quantity of which a value is not able to be measured by the measurement instrument 20. On the other hand, when the number of measurement instruments 20 provided in the target device 10 increases, the number of measurement values transmitted and received also increases inevitably. It is certain that the accuracy of management improves by performing management on the basis of a number of measurement values, but when the amount of data transmitted and received increases, there is a possibility that a time which will be taken to perform communication also increases, and that management in real time is not able to be performed.

On the other hand, a management system 1 according to a second embodiment obtains some values of state quantities of which values can be measured by the measurement instrument 20 through estimation thereof, and suppresses a delay of management due to a communication time. The management system 1 according to the second embodiment is different from that of the first embodiment in the configuration of the communication device 30.

<<Configuration of Communication Device>>

Figure 4:
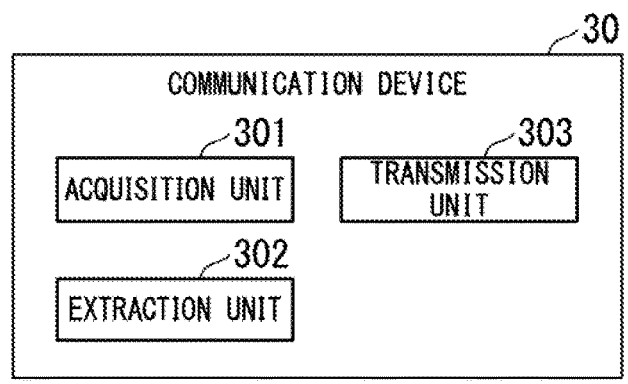
FIG. 4 is a schematic block diagram showing a configuration of a communication device according to a second embodiment.

FIG. 4 is a schematic block diagram showing a configuration of a communication device according to the second embodiment.

The communication device 30 according to the second embodiment does not transmit all measurement values measured by the measurement instrument 20 to the management device 40, but transmits only some of them to the management device 40.

The communication device 30 includes an acquisition unit 301, an extraction unit 302, and a transmission unit 303.

The acquisition unit 301 acquires a measurement value from each of a plurality of measurement instruments 20.

The extraction unit 302 extracts a measurement value transmitted to the management device 40 from among the acquired measurement values. The extraction unit 302 extracts a measurement value to be transmitted on the basis of an evaluation item in the management device 40. For example, the extraction unit 302 extracts a measurement value of a state quantity in which a relatively large coefficient is set in the calculation of an evaluation item as a measurement value to be preferentially transmitted.

The transmission unit 303 transmits the measurement value extracted by the extraction unit 302 to the management device 40.

<<Operation of Management System>>

Figure 5:
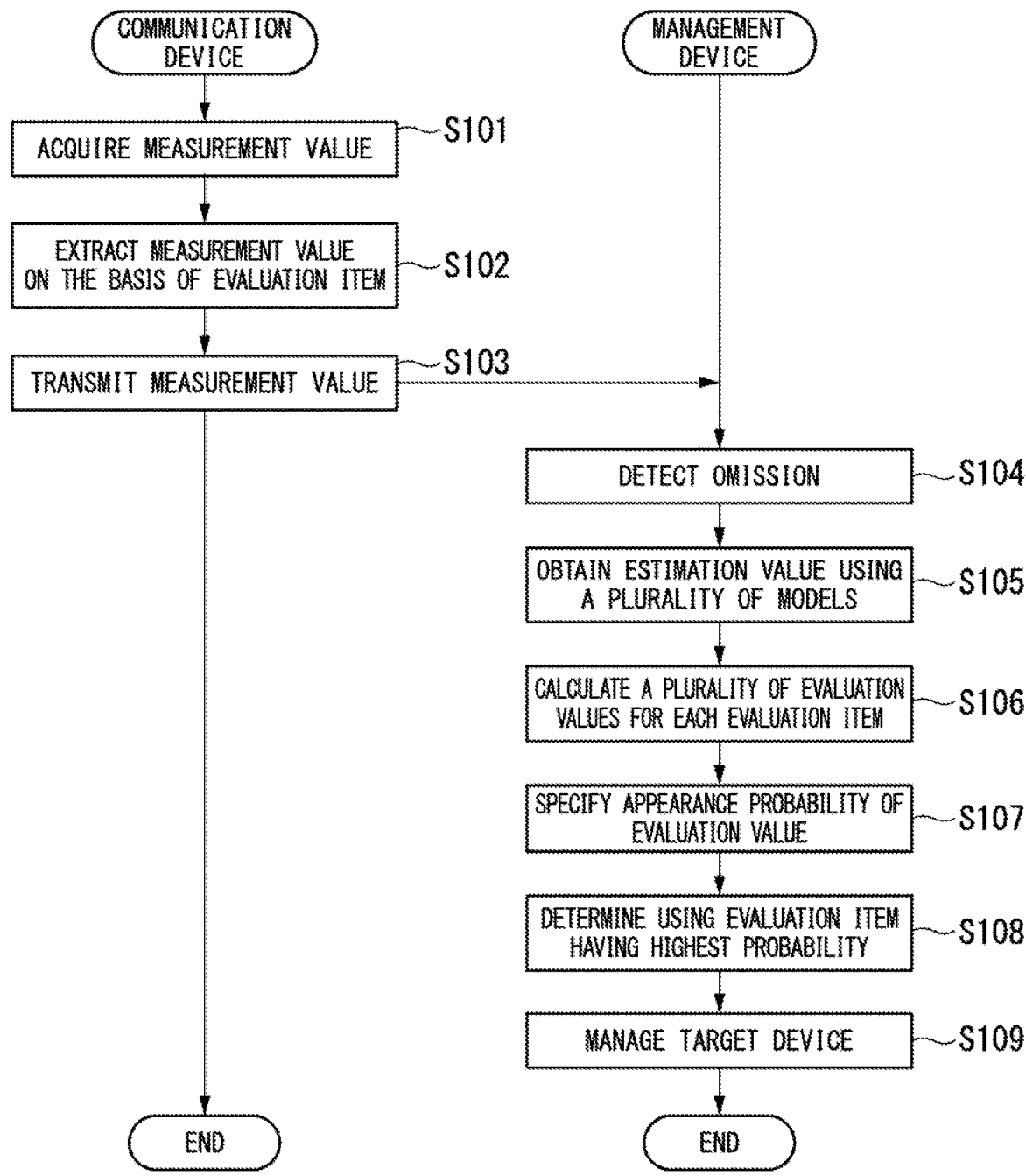
FIG. 5 is a sequence diagram showing operations of a management system according to the second embodiment.

FIG. 5 is a sequence diagram showing operations of the management system according to the second embodiment.

When management by the management system 1 is started, the acquisition unit 301 of the communication device 30 acquires a measurement value from the measurement instrument 20 (step S101). Next, the extraction unit 302 extracts a measurement value of a state quantity on the basis of an evaluation item in the management device 40 from the acquired measurement value (step S102). The transmission unit 303 transmits the acquired measurement value to the management device 40 (step S103).

When the measurement value acquisition unit 401 of the management device 40 receives a measurement value from the communication device 30, the omission detection unit 402 detects the omission of the measurement value acquired by the measurement value acquisition unit 401 (step S104). In this case, the omission detection unit 402 can detect the omission of a state quantity which is not extracted by the communication device. The estimation unit 404 applies the measurement value acquired by the measurement value acquisition unit 401 to each of a plurality of models to obtain each of estimation values of state quantities of which the omission is detected (step S105).

Next, the evaluation value calculation unit 405 calculates values of a plurality of evaluation items on the basis of each of a plurality of estimation values estimated by the estimation unit 404 (step S106). The probability specification unit 407 specifies an appearance probability of each evaluation value on the basis of the probability distribution information stored in the probability distribution storage unit 406 (step S107). The evaluation value determination unit 408 then determines an evaluation value having a highest probability specified by the probability specification unit 407, for each evaluation item, as a value of an evaluation item to be used for the management of the target device 10 (step S108). That is, according to the first embodiment, the value of each evaluation item can be calculated by a value of a state quantity estimated by a model which is different for each evaluation item. In this case, the value of a state quantity used for calculation in each evaluation item may differ. The management unit 409 then manages the target device 10 on the basis of the evaluation value determined by the evaluation value determination unit 408 (step S109).

«Operations and Effects»

In this manner, according to the second embodiment, it is possible to reduce the amount of communication with the management device 40 by not transmitting some measurement values. Thereby, the management system 1 according to the second embodiment can suppress a delay of management due to a communication time.

Meanwhile, the value of a state quantity which is not transmitted is handled as an omitted value by the omission detection unit 402 of the management device 40. This value is set to a value having a relatively low influence on the value of an evaluation item as described above. Therefore, even when the communication device 30 does not transmit some measurement values, the management device 40 can obtain a value of an evaluation item with a sufficient degree of accuracy.

Third Embodiment

The management system 1 according to the second embodiment extracts a measurement value to be transmitted to the communication device 30. On the other hand, in a management system 1 according to a third embodiment, the management device 40 specifies a measurement value to be received. The management system 1 according to the third embodiment is different from that of the second embodiment in the configuration of the management device 40.

<<Configuration of Management Device>>

Figure 6:
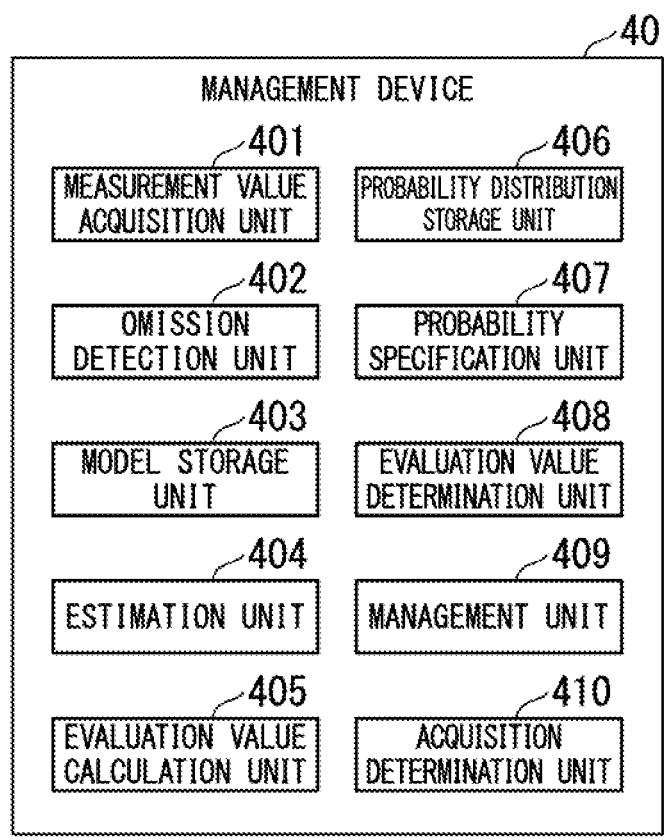
FIG. 6 is a schematic block diagram showing a configuration of a management device according to a third embodiment.

FIG. 6 is a schematic block diagram showing a configuration of the management device according to the third embodiment.

The management device 40 further includes an acquisition determination unit 410 in addition to the configuration according to the first embodiment. The acquisition determination unit 410 specifies a state quantity of which a measurement value is to be received from the communication device 30 on the basis of an evaluation item to be used for the management of the target device 10. The acquisition determination unit 410 notifies the communication device 30 of information of a state quantity specified in the communication device.

For example, similarly to the second embodiment, the acquisition determination unit 410 determines a measurement value of a state quantity in which a relatively large coefficient is set in the calculation of an evaluation item as a state quantity of which a measurement value is to be preferentially received. In addition, for example, the acquisition determination unit 410 may specify a state quantity of which a measurement value is to be received from the communication device 30 on the basis of the configuration of the target device 10. Specifically, in a case where the target device 10 includes a plurality of instruments of the same type, the acquisition determination unit 410 may determine state quantities of some of the instruments as state quantities to be received, and determine state quantities of other instruments of the same type as state quantities to be estimated. In addition, in a case where the target device 10 includes a plurality of instruments connected in series to each other, state quantities of some of the instruments may be determined as state quantities to be estimated, and state quantities of the front and rear instruments may be determined as state quantities of which measurement values are to be received. This is because, when a state quantity of a certain instrument related to input and output of the instrument is known, the state quantity of the instrument can be accurately estimated.

<<Operation of Management System>>

Figure 7:
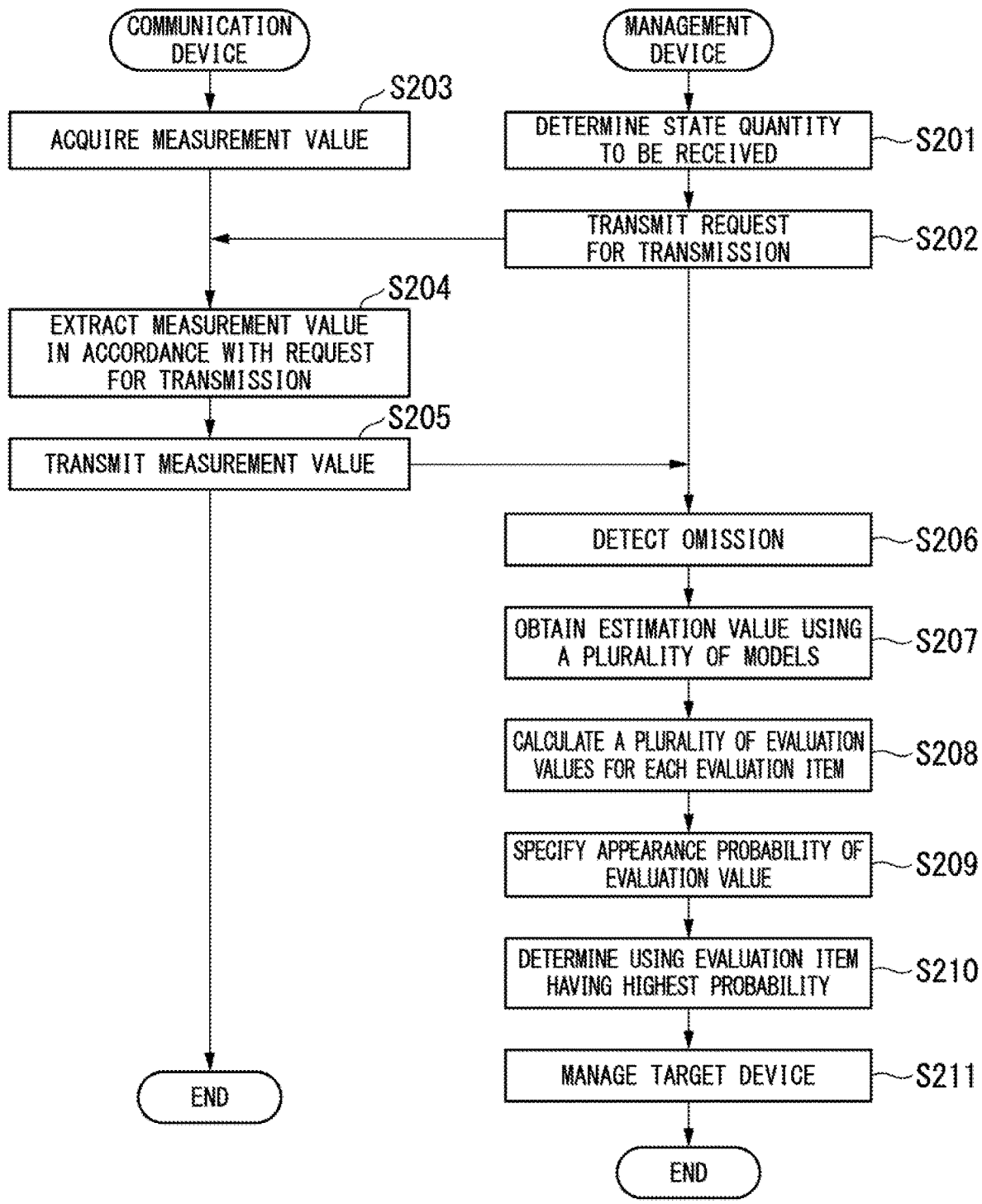
FIG. 7 is a sequence diagram showing operations of a management system according to the third embodiment.

FIG. 7 is a sequence diagram showing operations of the management system according to the third embodiment.

When the management device 40 starts to manage the target device 10, the acquisition determination unit 410 determines a state quantity of which a measurement value is to be received from the communication device 30 on the basis of an evaluation item (step S201). The acquisition determination unit 410 transmits a request for transmission of the determined state quantity to the communication device 30 (step S202).

The communication device 30 acquires a measurement value from the measurement instrument 20 (step S203). When the communication device 30 receives a request for transmission from the management device 40, the extraction unit 302 extracts a measurement value of a state quantity indicated by the request for transmission from the acquired measurement value (step S204). The transmission unit 303 transmits the measurement value extracted by the extraction unit 302 to the management device 40 (step S205).

When the measurement value acquisition unit 401 of the management device 40 receives a measurement value from the communication device 30, the omission detection unit 402 detects the omission of the measurement value acquired by the measurement value acquisition unit 401 (step S206). The estimation unit 404 applies the measurement value acquired by the measurement value acquisition unit 401 to each of a plurality of models to obtain each of estimation values of state quantities of which the omission is detected (step S207). Next, the evaluation value calculation unit 405 calculates values of a plurality of evaluation items on the basis of each of a plurality of estimation values estimated by the estimation unit 404 (step S208).

Next, the probability specification unit 407 specifies an appearance probability of each evaluation value on the basis of the probability distribution information stored in the probability distribution storage unit 406 (step S209). The evaluation value determination unit 408 then determines an evaluation value having a highest probability specified by the probability specification unit 407, for each evaluation item, as a value of an evaluation item to be used for the management of the target device 10 (step S210). The management unit 409 then manages the target device 10 on the basis of the evaluation value determined by the evaluation value determination unit 408 (step S211).

«Operations and Effects»

In this manner, according to the third embodiment, the management device 40 specifies a state quantity of which a measurement value is to be acquired, and transmits a request for transmission of the state quantity to the communication device 30. Thereby, the management system 1 according to the third embodiment can suppress a delay of management due to a communication time.

Meanwhile, in the third embodiment, the omission detection unit 402 detects the omission of a measurement value, but there is no limitation thereto. For example, in a case where the estimation unit 404 estimates measurement values of the remaining state quantities which are not selected as state quantities to be received in step S201 in other embodiments, the management device 40 may not necessarily include the omission detection unit 402.

Fourth Embodiment

The management system 1 according to the second and third embodiments specifies whether it is necessary to measure a value of a state quantity on the basis of an evaluation item or a configuration. On the other hand, a management system 1 according to a fourth embodiment specifies a state quantity of which a value is to be measured on the basis of the correlation of state quantities.

The management device 40 can estimate a value of another state quantity by inputting a measurement value of a certain state quantity to a model. Here, an inverse function may be established depending on a model. That is, in a case where an inverse function of a model in which a value of a second state quantity is output by inputting a value of a first state quantity is established, the model can be used in calculating the value of a first state quantity from the value of the second state quantity.

Here, the management system 1 according to the fourth embodiment is configured such that the extraction unit 302 of the communication device 30 or the acquisition determination unit 410 of the management device 40 sets one group of state quantities out of two groups of state quantities having a relationship of input and output of a certain model as an explanation variable (a state quantity of which a value is to be measured), and sets the other group of state quantities as an objective variable (a state quantity of which a value is to be estimated).

Figure 8:
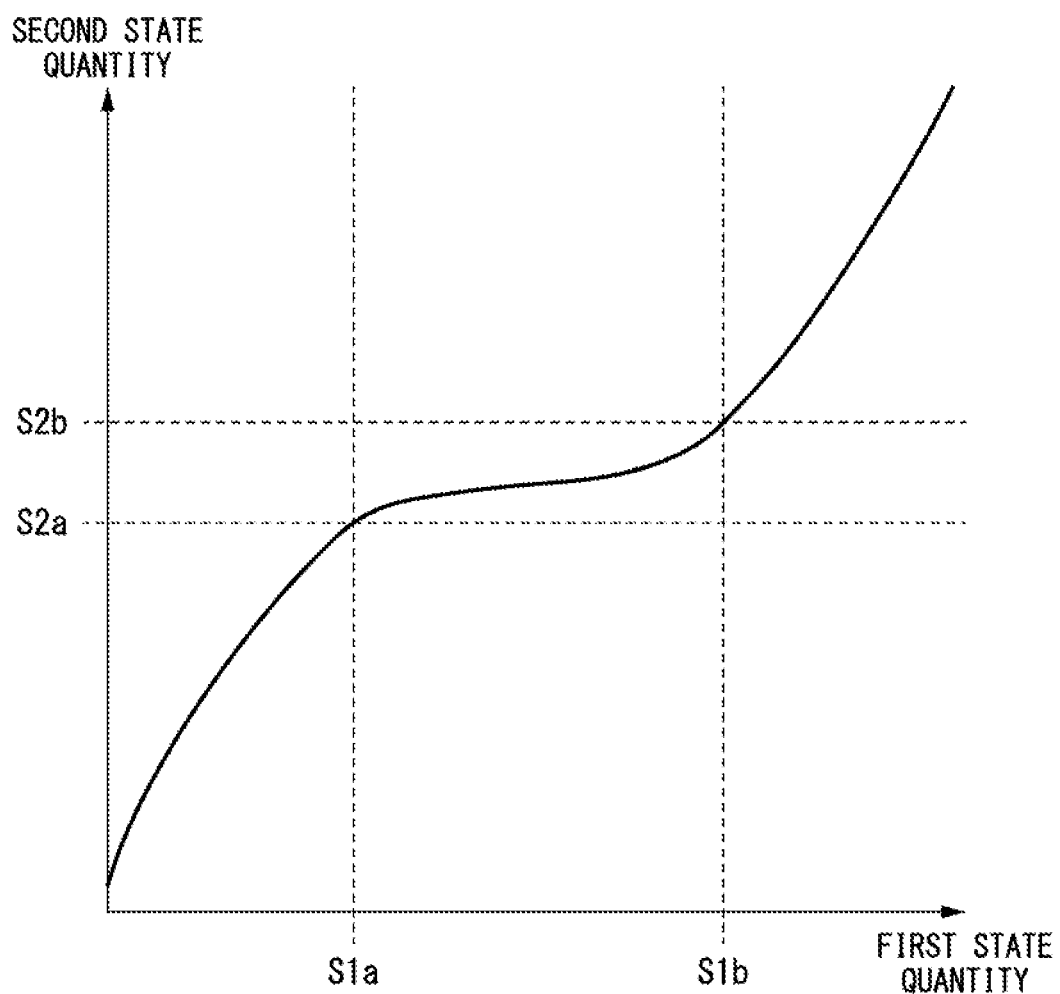
FIG. 8 is a diagram showing an example of an operation of a management system according to a fourth embodiment.

FIG. 8 is a diagram showing an example of an operation of the management system according to the fourth embodiment.

A graph shown in FIG. 8 is an example of a model for describing a relationship between the first state quantity and the second state quantity. In the graph shown in FIG. 8, the horizontal axis represents a value of the first state quantity, and the vertical axis represents a value of the second state quantity.

When the value of the first state quantity is S$1a$, the value of the second state quantity is set to S$2a$. In this case, the ratio of change of the second state quantity to the first state quantity is set to 1. Similarly, the ratio of change of the first state quantity to the second state quantity is set to 1. That is, the differential value of the coordinates (S$1a$, S$2a$) on the graph shown in FIG. 8 is set to 1. When the value of the first state quantity is less than S$1a$, the value of the second state quantity becomes less than S$2a$. In this case, the ratio of change of the second state quantity to the first state quantity becomes larger than 1. That is, the ratio of change of the first state quantity to the second state quantity becomes smaller than 1.

When the value of the first state quantity is S$1b$, the value of the second state quantity is set to S$2b$. In this case, the ratio of change of the second state quantity to the first state quantity is set to 1. Similarly, the ratio of change of the first state quantity to the second state quantity is set to 1. That is, the differential value of the coordinates (S$ib$, S$2b$) on the graph shown in FIG. 8 is set to 1. When the value of the first state quantity is greater than S$1a$ and less than S$1b$, the value of the second state quantity is set to be greater than S$2a$ and less than S$2b$. In this case, the ratio of change of the second state quantity to the first state quantity becomes smaller than 1. That is, the ratio of change of the first state quantity to the second state quantity becomes larger than 1.

When the value of the first state quantity is greater than S1b, the value of the second state quantity is set to be greater than S2b. In this case, the ratio of change of the second state quantity to the first state quantity becomes larger than 1. That is, the ratio of change of the first state quantity to the second state quantity becomes smaller than 1.

In the model as shown in FIG. 8, when the value of the second state quantity is greater than S2a and less than S2b, in a case where the value of the first state quantity is estimated from a measurement value of the second state quantity, the value of the first state quantity fluctuates greatly due to an error included in the measurement value of the second state quantity. On the other hand, it can be understood that, in a case where the value of the second state quantity is estimated from a measurement value of the first state quantity, fluctuation due to an error included in the measurement value of the first state quantity does not have a great influence on the value of the second state quantity. This is because the ratio of change of the second state quantity to the first state quantity is smaller than the ratio of change of the first state quantity to the second state quantity.

Therefore, in the example shown in FIG. 8, in a case where a measurement value to be transmitted in the communication device 30 is determined, the extraction unit 302 determines, for example, measurement values to be transmitted as follows. In a case where the measurement value of the first state quantity is less than S1a, or the measurement value of the first state quantity is equal to or greater than S1b, the extraction unit 302 determines that the measurement value of the second state quantity is transmitted, and that the measurement value of the first state quantity is not transmitted. In a case where the measurement value of the first state quantity is equal to or greater than S1a and less than S1b, the extraction unit 302 determines that the measurement value of the first state quantity is transmitted, and that the measurement value of the second state quantity is not transmitted. Meanwhile, in other embodiments, the extraction unit 302 may determine a measurement value to be transmitted on the basis of the measurement value of the second state quantity, and may determine a measurement value to be transmitted on the basis of both the measurement value of the first state quantity and the measurement value of the second state quantity.

In addition, in the example shown in FIG. 8, in a case where a measurement value to be received in the management device 40 is determined, the acquisition determination unit 410 determines, for example, measurement values to be transmitted as follows. In a case where the previous value of first state quantity is less than S1a, or the previous value of the first state quantity is equal to or greater than S1b, the acquisition determination unit 410 generates a request for transmission of the measurement value of the second state quantity. In a case where the previous value of the first state quantity is equal to or greater than S1a and less than S1b, the acquisition determination unit 410 generates a request for transmission of the measurement value of the first state quantity. Meanwhile, in other embodiments, the acquisition determination unit 410 may determine a measurement value to be received on the basis of the previous value of the second state quantity, and may determine a measurement value to be received on the basis of both the previous value of the first state quantity and the previous value of the second state quantity. In addition, in other embodiments, the acquisition determination unit 410 may determine a measurement value to be received in view of the rate of change of a value of a state quantity.

In this manner, the management system 1 according to the fourth embodiment determines that values of one group of state quantities out of two groups of state quantities having a relationship of input and output of a certain model are measured, and that values of the other group of state quantities are estimated. In this case, as a criterion for judgment, in a point where the absolute value of the ratio of change of a value of a state quantity in a model is set to 1, a group of which values are to be measured and a group of which values are to be estimated can be separated from each other. Thereby, the management system 1 according to the fourth embodiment can reduce the influence of an error on an estimation value.

Fifth Embodiment

According to the first to fourth embodiments, the management device 40 generates estimation values of state quantities on the basis of a plurality of models. In a fifth embodiment, an operation when one of a plurality of models is a statistical model will be described.

<<Configuration of Management Device>>

Figure 9:
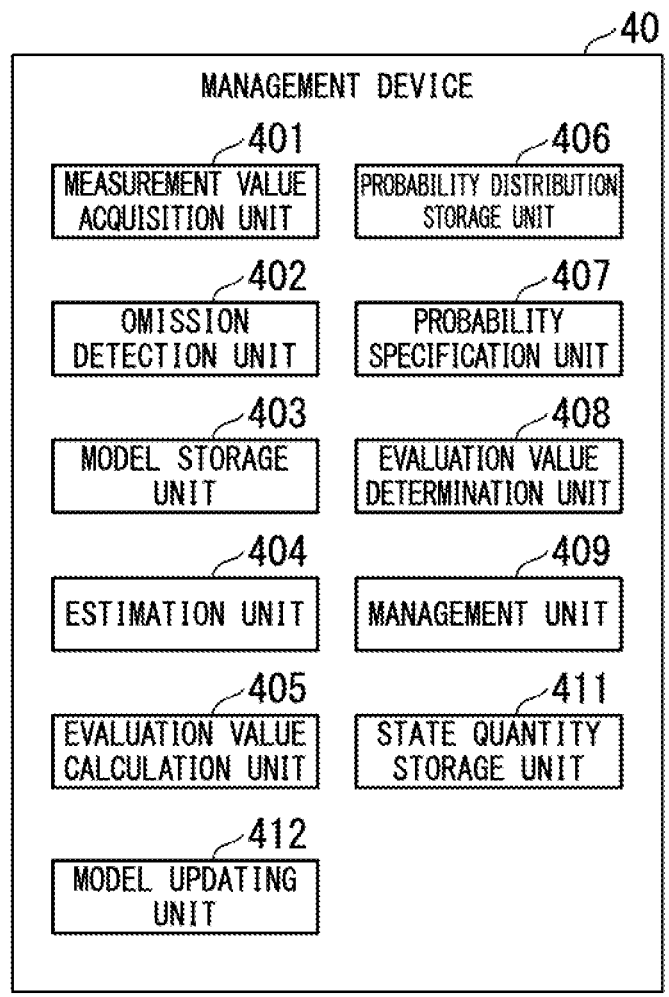
FIG. 9 is a schematic block diagram showing a configuration of a management device according to a fifth embodiment.

FIG. 9 is a schematic block diagram showing a configuration of a management device according to the fifth embodiment.

A management device 40 according to the fifth embodiment further includes a state quantity storage unit 411 and a model updating unit 412 in addition to the configuration of the first embodiment. The model updating unit 412 updates a statistical model among a plurality of models stored in the model storage unit 403 on the basis of values of the past state quantities stored in the state quantity storage unit 411.

<<Operation of Management Device>>

Figure 10:
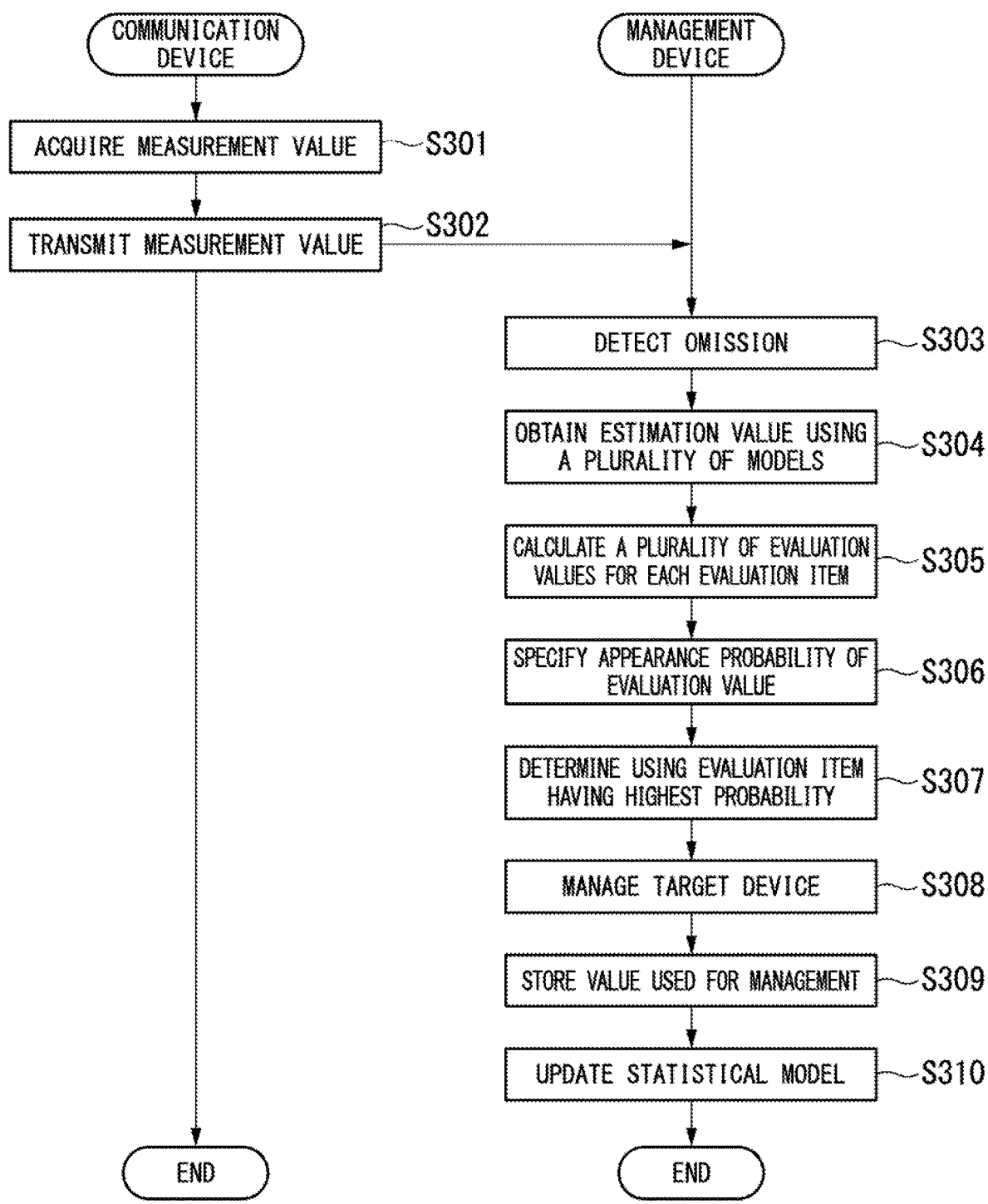
FIG. 10 is a sequence diagram showing operations of a management system according to the fifth embodiment.

FIG. 10 is a sequence diagram showing operations of a management system according to the fifth embodiment.

When management by the management system 1 is started, the communication device 30 acquires a measurement value from the measurement instrument 20 (step S301). The communication device 30 transmits the acquired measurement value to the management device 40 (step S302).

When the measurement value acquisition unit 401 of the management device 40 receives a measurement value from the communication device 30, the omission detection unit 402 detects the omission of the measurement value acquired by the measurement value acquisition unit 401 (step S303). The estimation unit 404 applies the measurement value acquired by the measurement value acquisition unit 401 to each of a plurality of models including a statistical model to obtain each of estimation values of state quantities of which the omission is detected (step S304).

Next, the evaluation value calculation unit 405 calculates values of a plurality of evaluation items on the basis of each of a plurality of estimation values estimated by the estimation unit 404 (step S305). Next, the probability specification unit 407 specifies an appearance probability of each evaluation value on the basis of the probability distribution information stored in the probability distribution storage unit 406 (step S306). The evaluation value determination unit 408 then determines an evaluation value having a highest probability specified by the probability specification unit 407, for each evaluation item, as a value of an evaluation item to be used for the management of the target device 10 (step S307). The management unit 409 then manages the target device 10 on the basis of the evaluation value determined by the evaluation value determination unit 408 (step S308).

Next, the acquisition unit 301 and the estimation unit 404 cause the state quantity storage unit 411 to store values used for the management of the target device 10 (step S309). The model updating unit 412 then updates a statistical model stored in the model storage unit 403 on the basis of the values stored in the state quantity storage unit 411 (step S310).

«Operations and Effects»

In this manner, according to the fifth embodiment, the estimation unit 404 can estimate a value of a state quantity by using a statistical model updated at a timing of the previous management at a timing of each management. The probability specification unit 407 specifies an appearance probability in each evaluation item of an estimation value based on the updated statistical model. That is, according to the fifth embodiment, it is possible to estimate a statistical estimation value with a higher degree of accuracy by updating not only statistical data but also the statistical model itself at a timing of each management.

Meanwhile, the management device 40 according to the fifth embodiment updates a statistical model on the basis of values of the past state quantities, but there is no limitation thereto. For example, in other embodiments, the management device 40 may not update a statistical model while storing a state quantity in the state quantity storage unit 411. Also in this case, the accuracy of estimation using a statistical model may be improved by storing the values of the past state quantities. For example, the estimation value of an average value approaches a true value according to the "law of large numbers" by the storage of data, and the range of dispersion is narrowed down, so that an improvement in estimation accuracy can be expected.

Other Embodiments

Although an embodiment has been described above in detail with reference to the accompanying drawing, a specific configuration is not limited to the above-described configurations, and various design changes and the like can be made.

For example, the management device 40 in the management system 1 according to the above-described embodiment has a function of extracting and specifying a value to be used for the management of the target device 10, but there is no limitation thereto. For example, in the management systems 1 according to the other embodiments, an information processing device extracting and specifying a value to be used for the management of the target device 10 may be provided separately from the management device 40, and the management device 40 may manage the target device 10 using the value specified by the information processing device.

In addition, according to the above-described embodiments, the management device 40 obtains a value of which the omission is detected through estimation thereof, but there is no limitation thereto. For example, in other embodiments, the management device 40 may obtain a value of a state quantity through estimation regardless of the presence or absence of omission and may specify a value to be used for the management of the target device 10 on the basis of a probability distribution for each of a measurement value and an estimation value.

In addition, according to the above-described embodiments, the management device 40 calculates a plurality of evaluation values using each of a plurality of estimation values generated using a different model, and then determines an evaluation value to be used for management from among the evaluation values, but there is no limitation thereto. For example, in other embodiments, before a plurality of estimation values are calculated, the management device 40 may determine whether being appropriate for the calculation of any evaluation item from the characteristics of a model. In this case, the estimation unit 404 obtains an estimation value using a model appropriate for each evaluation item, and the evaluation value calculation unit 405 calculates an evaluation value using the estimation value. In addition, in other embodiments, the management device 40 may determine whether being appropriate for the calculation of any evaluation item from the calculated estimation value. In this case, the evaluation value calculation unit 405 calculates an evaluation value using an estimation value appropriate for each evaluation item. Any of the above methods is equivalent to determining a model for estimating a value of a state quantity of the target device 10 for each evaluation item.

<Configuration of Computer>

Figure 11:
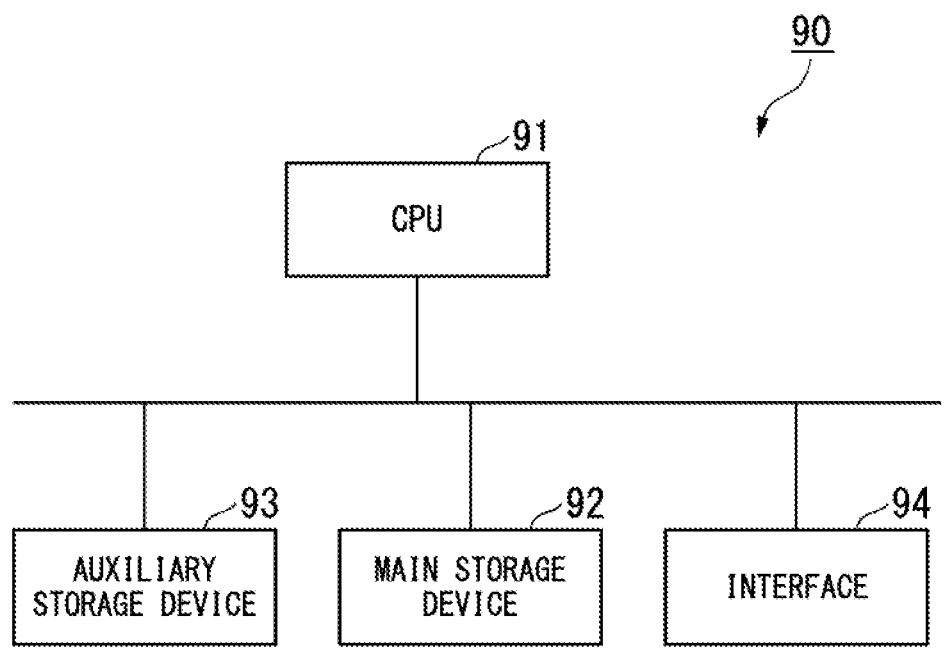
FIG. 11 is a schematic block diagram showing a configuration of a computer according to at least one embodiment.

FIG. 11 is a schematic block diagram showing a configuration of a computer according to at least one embodiment.

A computer 90 includes a CPU 91, a main storage device 92, an auxiliary storage device 93, and an interface 94.

The communication device 30 and the management device 40 described above include the computer 90. Operations of the above-described processing units are stored in the auxiliary storage device 93 in a format of a program. The CPU 91 reads out a program from the auxiliary storage device 93, develops the program in the main storage device 92, and executes the above-described processing in accordance with the program. In addition, the CPU 91 secures a storage area corresponding to the above-described storage unit in the main storage device 92 in accordance with a program.

Examples of the auxiliary storage device 93 include a hard disk drive (HDD), a solid state drive (SSD), a magnetic disc, a magneto-optical disc, a compact disc read only memory (CD-ROM), a digital versatile disc read only memory (DVD-ROM), a semiconductor memory, and the like. The auxiliary storage device 93 may be an internal medium directly connected to a bus of the computer 90 or may be an external medium connected to the computer 90 through the interface 94 or a communication line. Further, in a case where the program is distributed to the computer 90 through a communication line, the computer 90 having the program distributed thereto may be developed in the main storage device 92 and may execute the above-described processing. In at least one embodiment, the auxiliary storage device 93 is a non-transitory tangible medium.

In addition, the program may be a program for realizing some of the above-described functions. Further, the program may be a so-called differential file (differential program) for realizing the above-described functions by a combination with other programs stored in the auxiliary storage device 93 in advance.

INDUSTRIAL APPLICABILITY

The information processing device according to the present invention estimates the value of the second state quantity on the basis of a model determined for each evaluation item for management of a target device. Thereby, it is possible to determine a model appropriate for each evaluation item for the purpose of use for the calculation of an estimation value of a state quantity of a target device.

REFERENCE SIGNS LIST

1 Management system
10 Target device
20 Measurement instrument
30 Communication device
40 Management device (information processing device)
401 Measurement value acquisition unit
402 Omission detection unit
403 Model storage unit
404 Estimation unit
405 Evaluation value calculation unit
406 Probability distribution storage unit
407 Probability specification unit
408 Evaluation value determination unit (model determination unit)
409 Management unit
412 Model updating unit

The invention claimed is:

1. A management system comprising a communication device and an information processing device,
wherein the communication device comprises:
an acquisition unit that is configured to acquire measurement values of state quantities of a target device, the state quantities containing a first state quantity and a second state quantity which correspond one to one;
an extraction unit that is configured to determine to transmit the measurement value of the first state quantity to the information processing device when a change of the second state quantity is less than a change of the first state quantity, to determine to transmit the measurement value of the second state quantity to the information processing device when the change of the second state quantity is greater than the change of the first state quantity, and
a transmission unit that is configured to transmit the measurement value of the first state quantity to the information processing device when the extraction unit determines to transmit the measurement value of the first state quantity,
wherein the information processing device comprises:
a measurement value acquisition unit that is configured to acquire the measurement value of the first state quantity;
a model determination unit that is configured to determine a model for estimating a value of the second state quantity of the target device for each evaluation item for management of the target device;
an estimation unit that is configured to estimate the value of the second state quantity for the each evaluation item on basis of the measurement value of the first state quantity using the model determined by the model determination unit; and
a management unit that is configured to calculate a value of the each evaluation item using the value of the second state quantity for the each evaluation item estimated by the estimation unit.

2. The management system according to claim 1, further comprising an acquisition determination unit that is configured to determine whether to acquire measurement values with respect to a plurality of state quantities of the target device,
wherein the measurement value acquisition unit is configured to acquire a measurement value of a state quantity in which it is determined that a measurement value is acquired, and
the estimation unit is configured to estimate a value of a state quantity in which it is determined that a measurement value is not acquired using the model.

3. The management system according to claim 2, wherein the acquisition determination unit is configured to determine whether to acquire a measurement value on basis of the each evaluation item.

4. The management system according to claim 2, wherein the acquisition determination unit is configured to determine whether to acquire a measurement value on basis of a configuration of the target device.

5. The management system according to claim 2, wherein the acquisition determination unit is configured to determine whether to acquire each measurement value relating to the measurement value of the first state quantity and the measurement value of the second state quantity on basis of a ratio of change of the measurement value of the first state quantity and a ratio of change of the measurement value of the second quantity in the model.

6. The management system according to claim 1, wherein the model includes at least any one of a statistical model and a physical model.

7. The management system according to claim 1, further comprising a model updating unit that is configured to update the model on basis of at least one of the measurement value of the first state quantity and the measurement value of the second state quantity,
wherein the estimation unit is configured to estimate the value of the second state quantity for the each evaluation item using the updated model.

8. A communication device comprising:
an acquisition unit that is configured to acquire measurement values of state quantities of a target device, the state quantities containing a first state quantity and a second state quantity which correspond one to one;
an extraction unit that is configured to determine to transmit the measurement value of the first state quantity to a management device when a change of the second state quantity is less than a change of the first state quantity, to determine to transmit the measurement value of the second state quantity to the management device when the change of the second state quantity is greater than the change of the first state quantity; and
a transmission unit that is configured to transmit the measurement value of the first state quantity to the management device when the extraction unit determines to transmit the measurement value of the first state quantity.

9. An information processing method by using an information processing device comprising following steps of:
acquiring measurement values of state quantities of a target device, the state quantities containing a first state quantity and a second state quantity which correspond one to one;
determining to transmit the measurement value of the first state quantity to the information processing device when a change of the second state quantity is less than a change of the first state quantity,
determining to transmit the measurement value of the second state quantity to the information processing device when the change of the second state quantity is greater than the change of the first state quantity, and transmitting the measurement value of the first state quantity to the information processing device when an extraction unit determines to transmit the measurement value of the first state quantity, acquiring the measurement value of the first state quantity by the information processing device;

determining a model for estimating a value of the second state quantity of the target device for each evaluation item for management by the information processing device;

estimating the value of the second state quantity for the each evaluation item on the basis of the measurement value of the first state quantity using the determined model by the information processing device; and calculating a value of the each evaluation item using the estimated value of the second state quantity for the each evaluation item by the information processing device.

10. A non-transitory readable medium comprising a program which when executed by a processor causes a computer to execute a method, the method comprising:

acquiring measurement values of state quantities of a target device, the state quantities containing a first state quantity and a second state quantity which correspond one to one;

determining to transmit the measurement value of the first state quantity to an information processing device when a change of the second state quantity is less than a change of the first state quantity, determining to transmit the measurement value of the second state quantity to the information processing device when the change of the second state quantity is greater than the change of the first state quantity, and transmitting the measurement value of the first state quantity to the information processing device when an extraction unit determines to transmit the measurement value of the first state quantity.

* * * * *